United States Patent
Handler et al.

(10) Patent No.: US 10,477,587 B2
(45) Date of Patent: Nov. 12, 2019

(54) LINEAR COMBINATION FOR RACH DETECTION

(71) Applicant: FREESCALE SEMICONDUCTOR, INC., Austin, TX (US)

(72) Inventors: Matanya Handler, Modiin (IL); Igor Levakov, Kfar Saba (IL)

(73) Assignee: NXP USA, Inc., Austin, TX (US)

( * ) Notice: Subject to any disclaimer, the term of this patent is extended or adjusted under 35 U.S.C. 154(b) by 228 days.

(21) Appl. No.: 15/063,543

(22) Filed: Mar. 8, 2016

(65) Prior Publication Data
US 2017/0265228 A1 Sep. 14, 2017

(51) Int. Cl.
*H04L 1/00* (2006.01)
*H04W 74/08* (2009.01)
*H04B 17/336* (2015.01)

(52) U.S. Cl.
CPC ...... *H04W 74/0833* (2013.01); *H04B 17/336* (2015.01)

(58) Field of Classification Search
CPC ... H04L 47/122; H04L 2212/00; H04L 45/24; H04L 12/4633; H04L 12/46
See application file for complete search history.

(56) References Cited

U.S. PATENT DOCUMENTS

| | | | |
|---|---|---|---|
| 8,345,804 B2 | 1/2013 | Song et al. | |
| 2008/0080461 A1* | 4/2008 | Lee | H04B 7/2637 370/342 |
| 2013/0095879 A1* | 4/2013 | Gupta | H04W 76/18 455/525 |
| 2014/0079145 A1* | 3/2014 | Sampath | H04B 7/0811 375/260 |
| 2015/0094114 A1* | 4/2015 | Rao | H04W 52/245 455/522 |

OTHER PUBLICATIONS

Heikkila, Tommi, "RAKE Receiver," S-72.333 Postgraduate Course in Radio Communications, Autumn 2004, pp. 1-5, downloaded from <<http://www.comlab.hut.fi/opetus/333/2004_2005_slides/RAKE_text.pdf>> on Mar. 4, 2016.

* cited by examiner

*Primary Examiner* — Abdelillah Elmejjarmi

(57) ABSTRACT

A method including receiving, by an antenna combiner of a wireless communication system, a set of Random Access Channel (RACH) sequences of a first RACH signal from a first antenna and a set of RACH sequences of a second RACH signal from a second antenna. The method further including selecting, by the antenna combiner, each RACH sequence of the set of RACH sequences of a selected RACH signal from a selected antenna that has a best Signal to Interference plus Noise Ratio (SINR) from each RACH sequence of the set of RACH sequences of the first RACH signal from the first antenna that has a first SINR and each RACH sequence of the set of RACH sequences of the second RACH signal from the second antenna that has a second SINR.

18 Claims, 3 Drawing Sheets

US 10,477,587 B2

LINEAR COMBINATION FOR RACH DETECTION

FIELD OF THE DISCLOSURE

This disclosure generally relates to a method and apparatus for Random Access Channel (RACH) detection utilizing linear combination.

BACKGROUND

Wireless base stations operate to provide communication for wireless user equipment devices over radio access networks of a wireless communication system. A radio access network is used by service providers to establish point-to-point communication paths, e.g., such as a communication between two smart phones, a smart phone and a data server, and the like. A wireless communication system has a wireless base station, and antennas that are used to facilitate the point-to-point communication paths. The wireless base station operates in conjunction with the antennas to communicate with the wireless user equipment devices, such as smart phones, which transmits and receives signals over the one or more antennas.

A typical wireless base station has a single antenna receiver and a peak search device for detecting new wireless user equipment devices' network access requests. During operation, the single antenna receiver performs frequency domain correlation of the received signal for each of the one or more antennas. The single antenna receiver then estimates the noise energy level of the one or more antennas and determines an estimated threshold value utilized for the one or more antennas. The single antenna receiver then performs a linear combination of the received signals of each of the one or more antennas to produce a uniform combined signal and provides the combined signal to the peak search device. Next, the peak search device searches for peaks that are higher than the estimated threshold value within the combined signal to detect which peaks are to be identified as carrying a valid random access channel sequence of the wireless communication, which indicate a specific wireless user equipment device's network access request. Detecting peaks within the combined signal in this way can result in a high probability of misdetection of the wireless user equipment devices' network access requests within the combined signal of the one or more antennas.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
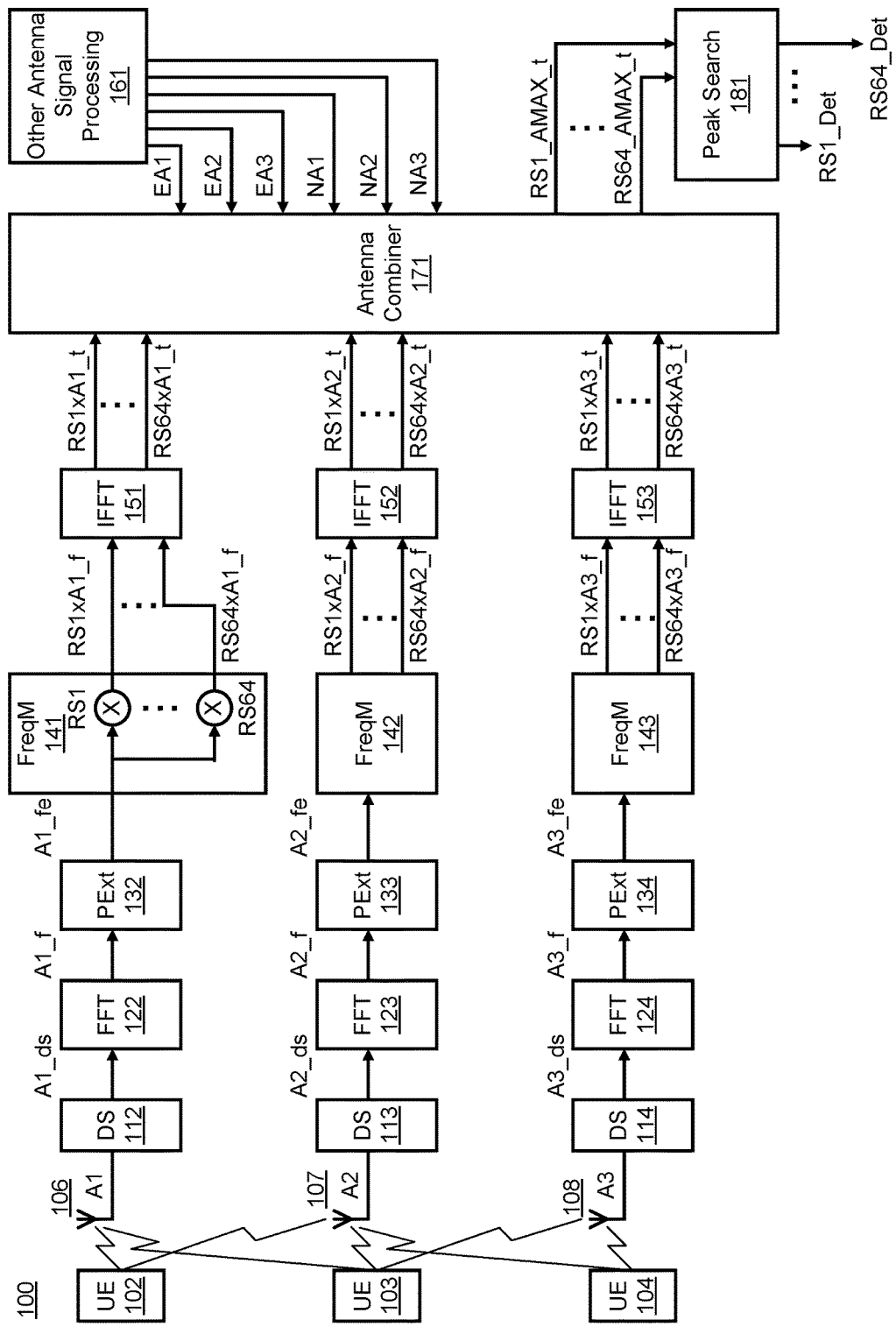
FIG. 1 is a block diagram illustrating a wireless communication system, in accordance with at least one embodiment of the present disclosure.

An embodiment of a wireless communication system is disclosed that includes a wireless base station and one or more user equipment devices that transmit information wirelessly to one or more antennas of the wireless base station. The wireless base station includes an antenna combiner and a peak search device. During operation, the user equipment devices communicate information via a set of signals, where each particular signal of the set of signals is a digitized representation of an analog signal referred to as an antenna carrier that that is associated with one antenna carrier being communicated via a particular user equipment devices. Each antenna carrier's digitized signal includes information on a Random Access Channel (RACH) associated with that one particular user equipment device. A RACH is a contention-based channel for initial uplink transmission, e.g., from the user equipment devices to the wireless base station. This channel can be used for several purposes including accessing the network, to request resources, to carry control information, to be the reference of adjusting the time offset of the uplink, to be the reference of adjusting the transmitted power, and to transmit small amounts of data. The wireless communication system defines a specific set of RACH sequences that are recognized and validated by the wireless base station and that individual user equipment devices can establish network access to the wireless communication system. To do so, a RACH sequence is transmitted on the RACH channel for a particular antenna carrier is associated with a particular user equipment device includes a specific user equipment device's network access request having one particular RACH sequence that the particular user equipment device selected from the specific set of RACH sequences for establishing network access. The set of signals received at each antenna of the wireless base station are converted to a set of RACH signals, where each one of the RACH signals includes the information of the RACH associated with one particular user equipment device. The set of RACH signals for each antenna is then transmitted to the antenna combiner. Each one of the set of RACH signals corresponds to a specific RACH sequence of the wireless communication system, associated with the network access request from the specific user equipment device.

The antenna combiner determines a Signal to Interference plus Noise Ratio (SINR) for each one of the received signals, an estimate of signal Energy for each one of the received signals from each antenna, and an estimate of signal Noise energy for each one of the received signals from each antenna. The antenna combiner utilizes the SINR for each one of the received signals to measure the quality for each one of the received signals from each antenna. The antenna combiner will determine for each RACH sequence which one of its RACH signals, one from each antenna, is deemed most likely to include that sequence. The selected signal for each RACH sequence is transmitted from the antenna combiner to a peak search device. The peak search device then analyzes each of these received selected signals using a peak search algorithm to determine which ones are to be identified as carrying a valid RACH sequence which can be one or more of detected received signals. Detecting peaks within the selected signals in this manner can result in a lower probability of misdetection of the wireless user equipment devices' network access requests and, as such, improves the detection of valid network access requests.

FIG. 1 illustrates a wireless communication system 100 in accordance with a specific embodiment. Examples of a wireless communication system includes one or more of a Long Term Evolution (LTE) system, a LTE advanced system, a Worldwide Interoperability for Microwave Access (WIMAX) system, a WIMAX advanced system, and a Wideband Code Division Multiple Access (WCDMA) system. In particular, the wireless communication system 100 includes a plurality of user equipment devices 102-104 that transmit information wirelessly between one or more antennas 106-108. Examples of a wireless user equipment unit include mobile stations such as mobile telephones, wearable devices, such as smart watches, a wireless robot, a laptop with mobile termination, an automobile telephone, a fixed wireless device, and the like, which can communicate voice, video, data, and the like with a radio access network.

In the illustrated embodiment, user equipment (UE) 102 and UE 103 communicate wireless information with antenna 106 represented by the designator A1; UE 102, UE 103, and UE 104 communicate wireless information with antenna 107 represented by the designator A2; and UE 103 and UE 104 communicate wireless information with antenna 108 represented by the designator A3. For ease of description, three antennas are illustrated, though any number of antennas can be used. Received signal A1 is transmitted to a down sampling module 112 that down samples the signal A1 and transmits down sampled signal A1_ds to a fast Fourier transform module 122. FFT 122 converts the received down sampled signal, A1_ds, from the time domain to the frequency domain which is represented by the designator A1_f, which is provided to a preamble extraction module 132.

Preamble extraction module 132 extracts RACH information from the frequency domain signal A1_f and provides this information as signal labeled A1_fe. The RACH information of signal, A1_fe, includes preamble sequence information from each one of the user equipment devices in communication with antenna 106. Therefore, the signal A1_fe includes RACH frequency information from user equipment 102 and from user equipment 103. Preamble extraction module 132 transmits signal A1_fe to a frequency multiplier 141 that includes a plurality of multiplicands RS1-RS64. In the exemplary embodiment, the number of multiplicands utilized by frequency multiplier 141 can be from 1 to 64 according to the configuration of frequency multiplier 141, or some other number as needed or desired. Each one of the plurality of multiplicands corresponds to a specific RACH sequence of the wireless communication system. By multiplying the digitized signal A1_fe by a particular sequence multiplier, a frequency domain signal is generated having those frequency components that would be expected to be present with respect to the particular RACH sequence. For example, when signal A1_fe is multiplied by the multiplier RS1, which is specific to a first RACH sequence, the result RS1×A1_f will contain those frequency components of RACH sequence 1 that were present in the signal A1_fe. Therefore, it will be appreciated, that if neither UE 102 nor UE 103 transmitted RACH sequence 1 in their RACH preamble, the frequency components of signal RS1× A1_f will be relatively small, indicating the frequency component was not present.

Similarly, the signal A1_fe is multiplied by a multiplier corresponding to each one of the other RACH sequences. Therefore, multiplier RS2 will generate a signal RS2×A1_f (not shown), and so on, until the last RACH sequence multiplier RS64, which generates signal RS64×A1_f. Each of the RACH sequence specific signals RS1×A1_f-RS64× A1_f are provided to an inverse fast Fourier transform module 151 which converts each of the received signals from the frequency domain to the time domain, and transmits these signals to an antenna combiner 171 for further processing. Therefore, signals RS1×A1_t-RS64×A1_t are transmitted from IFFT 151 to antenna combiner 171.

Similarly, UE 102-UE 104 communicate wireless information with antenna 107 represented by the designator A2. Received signal A2 is transmitted to a down sampling module 113 that down samples the signal A2 and transmits down sampled signal A2_ds to a fast Fourier transform module 123. FFT 123 converts the received down sampled signal, A2_ds, from the time domain to the frequency domain which is represented by the designator A2_f, which is provided to a preamble extraction module 133. Preamble extraction module 133 extracts RACH information from the frequency domain signal A2_f, which is transmitted from preamble extraction module 133 as signal labeled A2_fe. The RACH information of signal A2_fe includes preamble sequence information from each one of the UE devices in communication with antenna 106. Therefore, the signal A2_fe includes RACH frequency information from UE 102-UE 104. Preamble extraction module 133 transmits signal A2_fe to a frequency multiplier 142. Frequency multiplier 142 includes a plurality of multiplicands RS1-RS64 (not shown) as previously described. By multiplying the digitized signal A2_fe by each of a particular sequence multiplier, multiplied signals in the frequency domain RS1× A2_f-RS64×A2_f are generated that provides those frequency components expected to be present with respect to the particular RACH sequence. Each of the RACH sequence specific signals RS1×A2_f-RS64×A2_f are provided to an inverse fast Fourier transform module 152 which converts each of the received signals from the frequency domain to the time domain, and transmits these signals RS1×A2_t-RS64×A2_t to antenna combiner 171.

Similarly, UE 103 and UE 104 communicate wireless information with antenna 108 represented by the designator A3. Received signal A3 is transmitted to a down sampling module 114 that down samples the signal A3 and transmits down sampled signal A3_ds to a fast Fourier transform module 124. FFT 124 converts the received down sampled signal, A3_ds, from the time domain to the frequency domain which is represented by the designator A3_f, which is provided to a preamble extraction module 134. Preamble extraction module 134 extracts RACH information from the frequency domain signal A3_f, which is transmitted from preamble extraction module 134 as signal labeled A3_fe. The RACH information of signal A3_fe includes preamble sequence information from each one of the user equipment devices in communication with antenna 106. Therefore, the signal A3_fe includes RACH frequency information from UE 102, UE 103, and UE 104. Preamble extraction module 134 transmits signal A3_fe to a frequency multiplier 143. Frequency multiplier 143 includes a plurality of multiplicands RS1-RS64 (not shown) as previously described. By multiplying the digitized signal A3_fe by each of a particular sequence multiplier, multiplied signals in the frequency domain RS1×A3_f-RS64×A3_f are generated that provides those frequency components expected to be present with respect to the particular RACH sequence. Each of the RACH sequence specific signals RS1×A3_f-RS64×A3_f are provided to an inverse fast Fourier transform module 153 which converts each of the received signals from the frequency domain to the time domain, and transmits these signals RS1×A3_t-RS64×A3_t to antenna combiner 171.

Antenna combiner 171 further receives, from other antenna signal processing modules 161, signals EA1-EA3, which are estimates of signal energy for each of antenna A1-A3, and signals NA1-NA3, which are estimates of the noise energy for each of antenna A1-A3. Based upon the information it receives, antenna combiner 171 determines which one of the three antennas A1-A2 has the best Signal to Interference plus Noise Ratio (SINR) for each RACH sequence of each antenna's RACH channel. Antenna combiner 171 utilizes the SINR for each one of the received signals to measure the quality for each one of the received signals from each Antenna. By selecting the RACH sequence signal with the maximum SINR ratio, the Antenna combiner 171 selects the RACH sequence received at one of the three antennas that is deemed most likely to include that sequence.

Antenna combiner 171 provides the RACH sequence signals that each have the maximum SINR ratio to peak search module 181, RS1_AMAX_t through RS64_AMAX_t. Peak search module 181 then analyzes each of these received signals using a traditional peak search algorithm to determine which ones are to be identified as carrying a valid RACH sequence which can be one or more of detected received signals, RS1_Det through RS64_Det. In a traditional system, a conventional peak detector receives the average of the antenna signals for each RACH sequence in a traditional system. In the present embodiment, peak search module 181 can be a conventional peak detector that receives only a single antenna signal having the maximum SINR ratio for each RACH sequence, RS1_AMAX_t through RS64_AMAX_t. In another embodiment, peak search module 181 can also receive SINR information and utilize the SINR information in a similar manner as conventional peak detectors use SNR to identify valid RACH sequences. The detected RACH signals, e.g. RS1_Det and RS64_Det, need to be further evaluated by the base station to complete a connection with a user equipment. Operation of the Antenna combiner 171 will be better understood in reference to FIG. 2.

Figure 2:
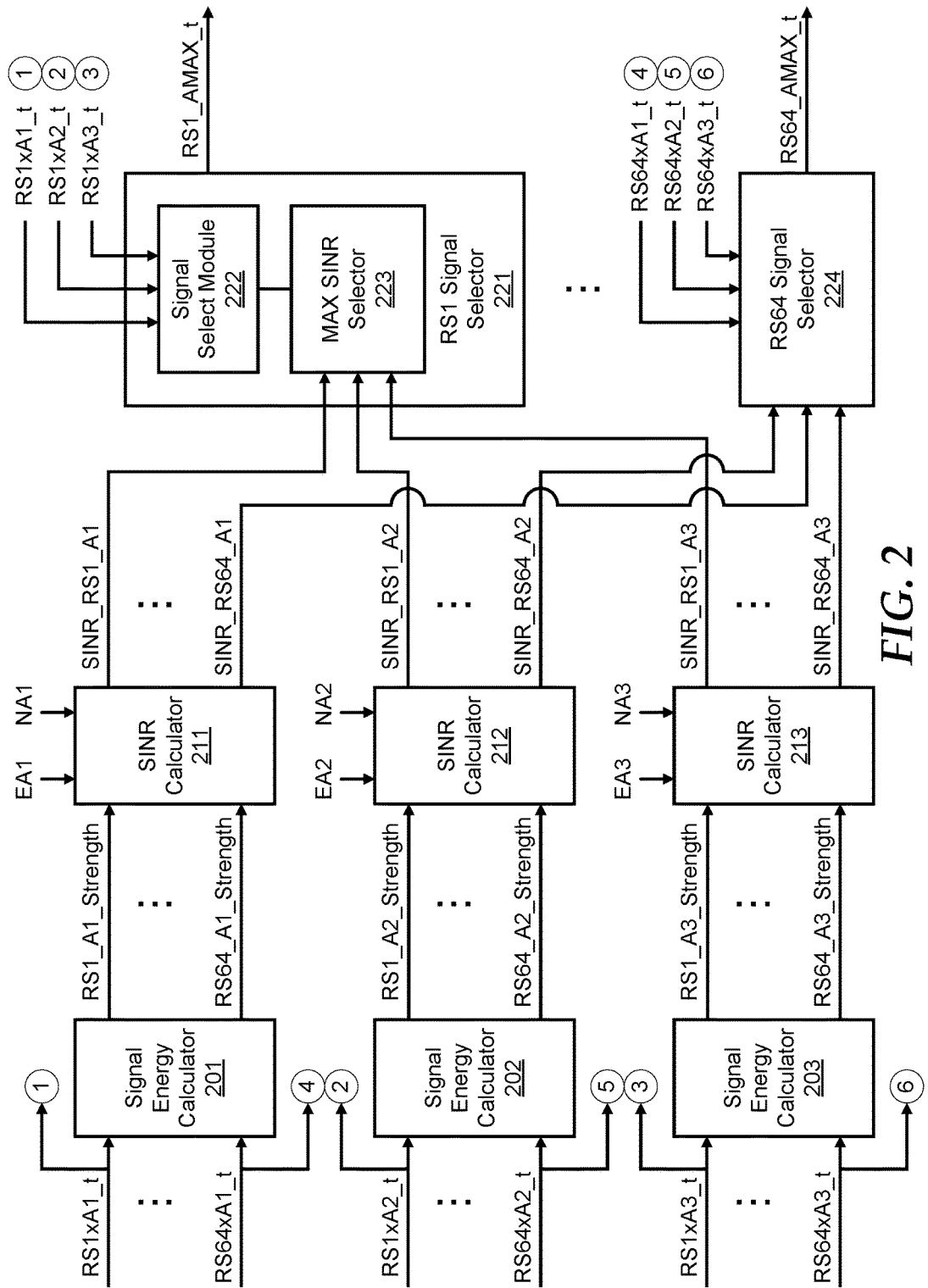
FIG. 2 is a block diagram illustrating the antenna combiner of FIG. 1 in more detail, in accordance with at least one embodiment of the present disclosure.

FIG. 2 illustrates antenna combiner 171 in more detail, in accordance with a specific embodiment. As shown, antenna combiner 171 includes a signal energy calculator 201 for antenna 106, a signal energy calculator 202 for antenna 107, and a signal energy calculator 203 for antenna 108, where each energy calculator generates a set of values of signal strength for each possible RACH sequence of a particular antenna. Thus, in the specific embodiment, signal energy calculator 201 evaluates all RACH sequences for antenna A1, RS1×A1_t-RS64×A1_t, to generate a set of values of signal strength for each possible RACH sequence of antenna A1, RS1_A1_Strength-RS64_A1_Strength. Similarly, signal energy calculator 202 evaluates all RACH sequences for antenna A2, RS1×A2_t-RS64×A2_t, to generate a set of values of signal strength for each possible RACH sequence of antenna A2, RS1_A2_Strength-RS64_A2_Strength, and signal energy calculator 203 evaluates all RACH sequences for antenna A3, RS1×A3_t-RS64×A3_t, to generate a set of values of signal strength for each possible RACH sequence of antenna A3, RS1_A3_Strength-RS64_A3_Strength.

The set of values of signal strength for each possible RACH sequence of each antenna is transmitted from the signal energy calculator for each antenna to a SINR calculator for each antenna, e.g., a SINR calculator 211 for antenna 106, a SINR calculator 212 for antenna 107, and a SINR calculator 213 for antenna 108. The estimates of the signal energy (EA) and the signal noise energy (NA) for each antenna are received at the SINR calculators from the other antenna signal processing 161 to the SINR calculator for each antenna. Each SINR calculator generates a set of values of SINR for each possible RACH sequence of each antenna. Thus, in the specific embodiment, SINR calculator 211 evaluates the set of values of signal strength for each possible RACH sequence of antenna A1, RS1_A1_Strength-RS64_A1_Strength, and the estimates of the signal energy EA1 and the signal noise energy NA1 to generate the set of values of SINR for each possible RACH sequence, SINR_RS1_A1-SINR_RS64_A1. Similarly, SINR calculator 212 evaluates the set of values of signal strength for each possible RACH sequence of antenna A2, RS1_A2_Strength-RS64_A2_Strength, and the estimates of the signal energy EA2 and the signal noise energy NA2 to generate the set of values of SINR for each possible RACH sequence, SINR_RS1_A2-SINR_RS64_A2, and SINR calculator 213 evaluates the set of values of signal strength for each possible RACH sequence of antenna A3, RS1_A3_Strength-RS64_A3_Strength, and the estimates of the signal energy EA3 and the signal noise energy NA3 to generate the set of values of SINR for each possible RACH sequence, SINR_RS1_A3-SINR_RS64_A3.

For each particular RACH sequence, a corresponding set of three SINR values and a set of three time domain representations upon which the three SINR values were calculated, are provided to a corresponding signal selector, along with the three RACH sequence signals upon which the SINR is based. For example, the RS1 signal selector 221 receives SINR values, SINR_RS1_A1 through SINR_RS1_A3, for the first RACH sequence, RS1, and corresponding time domain signals, RS1×A1_t through RS1×A3_t. Each of the separate signal select modules includes a MAX SINR select module and a signal select module. Thus, RS1 signal selector 221 includes a MAX SINR selector 223 that receives the SINR signals SINR_RS1_A1 through SINR_R1_A3, and that provides a select value at an output that indicates which one of the three SINR values is the largest. For example, MAX SINR selector 223 evaluates the set of SINR values for RACH sequence RS1 from each antenna to generate an index that indicates which antenna has the maximum/"best" SINR value for the particular RACH sequence. Thus, in the specific embodiment, a MAX SINR selector 223 of RS1 signal selector 221 evaluates SINR_RS1_A1, SINR_RS1_A2, and SINR_RS1_A3 to generate the index of the antenna having the maximum/"best" SINR value. For example, when SINR_RS1_A1 has the value 4, SINR_RS1_A2 has the value 2, and SINR_RS1_A3 has the value 8, MAX SINR selector 223 generates the index of antenna A3. The signal select module utilizes the index of the antenna having the maximum/"best" SINR value provided by the MAX SINR selector to determine which of the antenna RACH sequences should be selected and provided to peak search device 181 as RS1_AMAX_t. Thus, in the specific embodiment, a signal select module 222 of RS1 signal selector 221 utilizes the index of the antenna having the maximum/"best" SINR value to determine which antenna RACH sequence, RS1×A1_t, RS1×A2_t, or RS1×A3_t should be selected. Note that the antenna RACH sequences, RS1×A1_t, RS1×A2_t, and RS1×A3_t are the same antenna RACH sequences as provided to signal energy calculators 201, 202, and 203, as indicated by the circled 1, 2, and 3, respectively. In the example, the index of antenna A3 is utilized to select RS1×A3_t, which is provided as RS1_AMAX_t to peak search device 181. Similarly, RS64 signal select module 224 evaluates SINR_RS64_A1, SINR_RS64_A2, and SINR_RS64_A3 to determine which antenna RACH sequence, RS64×A1_t, RS64×A2_t, or RS64×A3_t should be selected and provided to peak search device 181 as RS64_AMAX_t. The antenna RACH sequences, RS64×A1_t, RS64×A2_t, and RS64×A3_t are the same antenna RACH sequences as provided to signal energy calculators 201, 202, and 203, as indicated by the circled 4, 5, and 6, respectively.

By selecting the one antenna RACH sequence having the maximum/"best" SINR value for each particular RACH sequence, the maximum SINR value is attained. This is an improvement over the prior art, which would provide an estimate of the signal for each time domain RACH sequence that calculated based upon each of that sequence's signals. For example, the signals RS1×A1_t through RS1×A3 could be averaged before being provided to the peak select circuitry 181. This is because if two or more antenna RACH sequences for each particular RACH sequence are selected, the SINR value of the two or more antenna RACH sequences will be less than the maximum SINR value attained by selecting only one antenna's RACH sequence. This is shown by considering any linear combination of the antenna energy sequence. Any linear combination of the antenna energy sequence within one access period is of the form:

$$y = \sum_{i=1}^{N\_ANT} C_i Y_i \text{ where}$$

$$\sum_{i=1}^{N\_ANT} C_i = C \text{ and without loss of generality } C = 1$$

$$\text{Recall that } \max\{X_i\} \geq \sum_{i=1}^{N\_ANT} C_i X_i,$$

$$j = \arg\max\{X_i\}$$

$$\sum_{i=1}^{N} C_i X_i = C_j * \max\{X_i\} i + \sum_{i \neq j} C_i X_i \leq C_j * \max\{X_i\} i +$$
$$\sum_{i \neq j} C_i * \max\{X_i\} i \neq j = C_j * \max\{X_i\} i + (1 - C_j) *$$
$$= \max\{X_i\} i \neq j \leq C_j * \max\{X_i\} i +$$
$$(1 - C_j) * \max\{X_i\} i$$
$$= \max\{X_i\} i$$

Therefore, the maximum SINR is attained when setting:

$C_j=1$ (for $j=\arg\max\{Y_i\}$), $C_j=0$ otherwise

Thus, by selecting the one antenna RACH sequence having the maximum/"best" SINR value for each particular RACH sequence, the maximum SINR value is attained.

Figure 3:
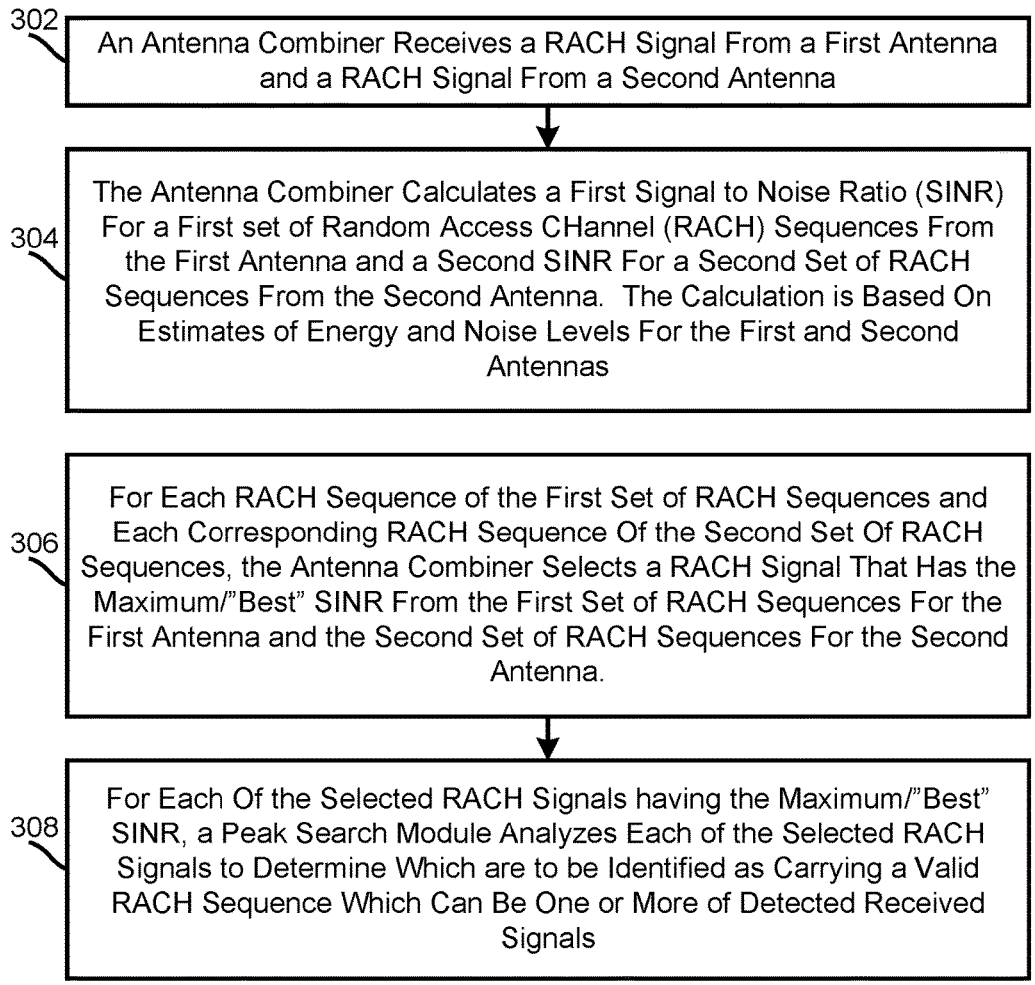
FIG. 3 illustrates a method of linear combination for Random Access Channel (RACH) detection, in accordance with at least one embodiment of the present disclosure.

FIG. 3 illustrates a method of linear combination for RACH detection 300, where the exemplary method 300 begins at block 302. At block 302, an antenna combiner receives a RACH signal from a first antenna and a RACH signal from a second antenna. At block 304, the antenna combiner calculates a first Signal to Noise Ratio (SINR) for a first set of Random Access Channel (RACH) sequences from the first antenna and a second SINR for a second set of RACH sequences from the second antenna. The calculation is based on estimates of energy and noise levels for the first and second antennas.

At block 306, for each RACH sequence of the first set of RACH sequences and each corresponding RACH sequence of the second set of RACH sequences, the antenna combiner selects a RACH signal that has the maximum/"best" SINR from the first set of RACH sequences for the first antenna and the second set of RACH sequences for the second antenna. At block 308, for each of the selected RACH signals having the maximum/"best" SINR, a peak search module analyzes each of the selected RACH signals to determine which are to be identified as carrying a valid RACH sequence which can be one or more of detected received signals. As such, the method of linear combination for Random Access Channel (RACH) detection 300 of wireless communication system 100 has successfully completed.

It will be appreciated that the devices disclosed herein can be implemented in various manners using various types of memory.

The interconnects disclosed herein are used to communicate information between various modules and devices either directly or indirectly. For example, each of the interconnects can be implemented as a passive device, such as conductive nodes that include one or more conductive traces, that transmits directly between the various modules and devices, or as an active device, where information being transmitted is buffered, for example stored and retrieved, in the process of being communicated between devices, such as at a first-in first-out memory or other memory device. In addition, a label associated with an interconnect can be used herein to refer to a signal and information transmitted by the interconnect.

Antenna combiner 171, other signal processing module 161, and peak search device 181, can be provided by, for example, an instruction based digital signal processor, an application specific integrated circuit device, a field programmable gate array (FPGA), a General Purpose Processor (GPP), another type of logic circuit capable of performing operations, the like, and combinations thereof. In an exemplary embodiment, REC 102 represents a digital baseband signal processor and RE 104 represents a digital signal processor.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
  receiving, by an antenna combiner of a wireless communication system, a first set of Random Access Channel (RACH) sequences obtained from first frequency components provided by a first frequency multiplier and a second set of RACH sequences obtained from second frequency components provided by a second frequency multiplier, wherein the first frequency components are generated based on a first RACH signal from a first antenna and the second frequency components are generated based on a second RACH signal from a second antenna;
  selecting, by the antenna combiner, a selection of each RACH sequence of a set of RACH sequences of a selected RACH signal from a selected antenna that has a best Signal to Interference plus Noise Ratio (SINR) from each RACH sequence of the set of RACH sequences of the first RACH signal from the first antenna that has a first SINR and each RACH sequence of the set of RACH sequences of the second RACH signal from the second antenna that has a second SINR, wherein each particular RACH sequence of the set of RACH sequences of the selected RACH signal from the selected antenna is associated with a corresponding particular user equipment device; and
  establishing network access according to the selection, wherein the first frequency components are obtained based on first preamble sequence information, wherein the first preamble sequence information corresponds to the first RACH signal, wherein the second frequency components are obtained based on second preamble sequence information, and wherein the second preamble sequence information corresponds to the second RACH signal.

2. The method of claim 1, further comprising: calculating, by a signal energy calculator, a signal strength of the first RACH signal for each RACH sequence of the set of RACH sequences and a signal strength of the second RACH signal for each RACH sequence of the set of RACH sequences.

3. The method of claim 1, further comprising: calculating, by a SINR calculator, the first SINR of each RACH sequence of the set of RACH sequences of the first RACH signal and the second SINR of each RACH sequence of the set of RACH sequences of the second RACH signal based on the signal strength of each RACH sequence of the set of RACH sequences of the first RACH signal, the signal strength of each RACH sequence of the set of RACH sequences of the second RACH signal, and estimates of energy and noise levels for the first and second antennas.

4. The method of claim 1, further comprising: detecting, by a peak search device, each RACH sequence of the set of RACH sequences of the selected RACH signal associated with a peak of the selected RACH signal that is higher than a SINR threshold value.

5. The method of claim 1, wherein the RACH is a contention-based channel between a user equipment (UE) and the selected antenna.

6. The method of claim 1, wherein the wireless communication system comprises one or more of a long term evolution (LTE) system, a LTE advanced system, a worldwide interoperability for microwave access (WIMAX) system, a WIMAX advanced system, and a wideband code division multiple access (WCDMA) system.

7. A wireless communication system comprising:
  a first antenna, a first frequency multiplier, a second antenna, a second frequency multiplier, and an antenna combiner, the antenna combiner configured to:
  receive a first set of Random Access Channel (RACH) sequences obtained from first frequency components provided by the first frequency multiplier and a second set of RACH sequences obtained from second frequency components provided by the second frequency multiplier, wherein the first frequency components are generated based on a first RACH signal from the first antenna and the second frequency components are generated based on the second RACH signal from the second antenna;
  select a selection of each RACH sequence of a set of RACH sequences of a selected RACH signal from a selected antenna that has a best Signal to Interference plus Noise Ratio (SINR) from each RACH sequence of the set of RACH sequences of the first RACH signal from the first antenna that has a first SINR and each RACH sequence of the set of RACH sequences of the second RACH signal from the second antenna that has a second SINR, wherein each particular RACH sequence of the set of RACH sequences of the selected RACH signal from the selected antenna is associated with a corresponding particular user equipment device; and
  establish network access according to the selection, wherein the first frequency components are obtained based on first preamble sequence information, wherein the first preamble sequence information corresponds to the first RACH signal, wherein the second frequency components are obtained based on second preamble sequence information, and wherein the second preamble sequence information corresponds to the second RACH signal.

8. The wireless communication system of claim 7, the antenna combiner further comprising: a signal energy calculator configured to calculate a signal strength of the first RACH signal for each RACH sequence of the set of RACH sequences and a signal strength of the second RACH signal for each RACH sequence of the set of RACH sequences.

9. The wireless communication system of claim 7, the antenna combiner further comprising: a SINR calculator configured to calculate the first SINR of each RACH sequence of the set of RACH sequences of the first RACH signal and the second SINR of each RACH sequence of the set of RACH sequences of the second RACH signal based on the signal strength of each RACH sequence of the set of RACH sequences of the first RACH signal, the signal strength of each RACH sequence of the set of RACH sequences of the second RACH signal, and estimates of energy and noise levels for the first and second antennas.

10. The wireless communication system of claim 7, further comprising: a Peak search device configured to detect each RACH sequence of the set of RACH sequences of the selected RACH signal associated with a peak of the selected RACH signal that is higher than a SINR threshold value.

11. The wireless communication system of claim 7, wherein the RACH is a contention-based channel between a user equipment (UE) and the selected antenna.

12. The wireless communication system of claim 7, wherein the antenna combiner is further configured to establish network access according to the selection.

13. The wireless communication system of claim 7, wherein the wireless communication system comprises one or more of a long term evolution (LTE) system, a LTE advanced system, a worldwide interoperability for microwave access (WIMAX) system, a WIMAX advanced system, and a wideband code division multiple access (WCDMA) system.

14. A method comprising: receiving, by an antenna combiner of a wireless communication system, a first set of Random Access Channel (RACH) sequences obtained from first frequency components provided by a first frequency multiplier and a second set of RACH sequences obtained from second frequency components provided by a second frequency multiplier, wherein the first frequency components are generated based on a first RACH signal from a first antenna and the second frequency components are generated based on a second RACH signal from a second antenna;
  selecting, by the antenna combiner, a selection of each RACH sequence of a set of RACH sequences of a selected RACH signal from a selected antenna that has a best Signal to Interference plus Noise Ratio (SINR) from each RACH sequence of the set of RACH sequences of the first RACH signal from the first antenna that has a first SINR and each RACH sequence of the set of RACH sequences of the second RACH signal from the second antenna that has a second SINR based on the RACH between a user equipment (UE) and the selected antenna, wherein each particular RACH sequence of the set of RACH sequences of the selected RACH signal from the selected antenna is associated with a corresponding particular user equipment device; and
  establishing network access according to the selection, wherein the first frequency components are obtained based on first preamble sequence information, wherein the first preamble sequence information corresponds to the first RACH signal, wherein the second frequency components are obtained based on second preamble sequence information, and wherein the second preamble sequence information corresponds to the second RACH signal.

15. The method of claim 14, further comprising: calculating, by a signal energy calculator, a signal strength of the first RACH signal for each RACH sequence of the set of RACH sequences and a signal strength of the second RACH signal for each RACH sequence of the set of RACH sequences.

16. The method of claim 14, further comprising: calculating, by a SINR calculator, the first SINR of each RACH sequence of the set of RACH sequences of the first RACH signal and the second SINR of each RACH sequence of the set of RACH sequences of the second RACH signal based on the signal strength of each RACH sequence of the set of RACH sequences of the first RACH signal, the signal strength of each RACH sequence of the set of RACH sequences of the second RACH signal, and estimates of energy and noise levels for the first and second antennas.

17. The method of claim 14, further comprising: detecting, by a peak search device, each RACH sequence of the set of RACH sequences of the selected RACH signal associated with a peak of the selected RACH signal that is higher than a SINR threshold value.

18. The method of claim 14, wherein the wireless communication system comprises one or more of a long term evolution (LTE) system, a LTE advanced system, a worldwide interoperability for microwave access (WIMAX) system, a WIMAX advanced system, and a wideband code division multiple access (WCDMA) system.

* * * * *